United States Patent
Walker et al.

(10) Patent No.: US 8,115,676 B2
(45) Date of Patent: Feb. 14, 2012

(54) COMMUNICATIONS SYSTEM AND METHOD OF COMMUNICATING DATA

(75) Inventors: Glenn A. Walker, Greentown, IN (US); Daniel G. Morris, Ovid, MI (US)

(73) Assignee: Delphi Technologies, Inc., Troy, MI (US)

( * ) Notice: Subject to any disclaimer, the term of this patent is extended or adjusted under 35 U.S.C. 154(b) by 699 days.

(21) Appl. No.: 12/229,297

(22) Filed: Aug. 21, 2008

(65) Prior Publication Data

US 2010/0045515 A1 Feb. 25, 2010

(51) Int. Cl.
*H01Q 21/06* (2006.01)

(52) U.S. Cl. .......................................... 342/361

(58) Field of Classification Search .................. 342/361, 342/374, 368
See application file for complete search history.

(56) References Cited

U.S. PATENT DOCUMENTS

| | | | |
|---|---|---|---|
| 6,697,642 B1 * | 2/2004 | Thomas | 455/562.1 |
| 7,786,933 B2 * | 8/2010 | Chang | 342/357.63 |
| 2006/0276145 A1 * | 12/2006 | Walker et al. | 455/102 |
| 2009/0021429 A1 * | 1/2009 | Colburn et al. | 342/374 |

* cited by examiner

*Primary Examiner* — Thomas Tarcza
*Assistant Examiner* — Nga X Nguyen
(74) *Attorney, Agent, or Firm* — Lawrence D. Hazelton (57) ABSTRACT

A communications system and method thereof are provided, wherein the system includes a first receiver. The first receiver includes at least one antenna element configured to receive the first signal having a first polarization, and a combiner in communication with the at least one antenna element, wherein the combiner enhances the first signal and minimizes a second signal having a second polarization that is different than the first polarization of the first signal, such that an output is emitted by the first receiver based upon the received first signal. The first receiver further includes a beam steerer in communication with the combiner, wherein the beam steerer is configured to steer an antenna beam of the at least one antenna element in order to minimize reflection of the second signal, such that the second polarization of the second signal remains different than the first polarization of the first signal.

19 Claims, 8 Drawing Sheets

|                 | Sat 1 | | Sat 2 | | Difference |
|-----------------|------|---------|------|---------|---------|
| Location        | Elev | Azimuth | Elev | Azimuth | Azimuth |
| Bangor, MI      | 36.0 | 202.4 | 21.4 | 235.9 | 33.5 |
| Brighton, MI    | 40.9 | 182.0 | 31.7 | 222.0 | 40.0 |
| Detroit, MI     | 41.4 | 182.9 | 31.8 | 222.8 | 39.9 |
| Escanaba, MI    | 37.4 | 177.1 | 30.6 | 216.5 | 39.4 |
| Flint, MI       | 40.4 | 181.9 | 31.3 | 221.7 | 39.8 |
| Kansas City, MO | 43.7 | 165.0 | 40.0 | 210.6 | 45.6 |
| Los Angeles, LA | 36.9 | 130.2 | 50.4 | 173.9 | 43.7 |
| McAllen, TX     | 56.1 | 152.1 | 54.1 | 214.3 | 62.2 |
| Miami, FL       | 59.4 | 190.8 | 41.2 | 237.9 | 47.1 |
| Olympia, WA     | 24.7 | 133.2 | 35.5 | 169.2 | 36.0 |
| Seattle, WA     | 24.6 | 134.1 | 35.0 | 170.1 | 36.0 |

FIG. 5

Typical Axial Ratio (AR) and Cross-Pol Rejection (XPR)

| theta (deg) | ele (deg) | $AR_{Ave}$ (dB) | $XPR_{Ave}$ (dB) |
|---|---|---|---|
| 30 | 60 | 2.01 | 18.62 |
| 35 | 55 | 2.07 | 18.33 |
| 40 | 50 | 2.25 | 17.56 |
| 45 | 45 | 2.36 | 17.01 |
| 50 | 40 | 2.43 | 16.83 |
| 55 | 35 | 2.80 | 15.75 |
| 60 | 30 | 3.41 | 14.12 |
| 65 | 25 | 4.18 | 12.34 |
| 70 | 20 | 5.45 | 10.27 |

| ele (deg) | Initial system 1 satellite Rx antenna: 2x2 array C/(N)$_{Ave}$(dB) | Add 2nd cross-pol satellite 2 satellites Rx antenna: 2x2 array C/(N+I)$_{Ave}$(dB) | Impact to 1st Gen Δ(dB) | 2 satellites MIMO* C/(N+I)$_{Ave}$(dB) |
|---|---|---|---|---|
| 60 | 13.5 | 12.8 | 0.8 | 10.5 |
| 55 | 13.1 | 12.4 | 0.8 | 10.1 |
| 50 | 12.7 | 11.9 | 0.8 | 9.7 |
| 45 | 12.0 | 11.2 | 0.8 | 9.0 |
| 40 | 11.3 | 10.6 | 0.7 | 8.3 |
| 35 | 10.6 | 9.8 | 0.8 | 7.6 |
| 30 | 10.0 | 9.0 | 0.9 | 7.0 |
| 25 | 9.2 | 8.0 | 1.2 | 6.2 |
| 20 | 7.8 | 6.5 | 1.3 | 4.8 |

FIG. 8

COMMUNICATIONS SYSTEM AND METHOD OF COMMUNICATING DATA

TECHNICAL FIELD

The present invention generally relates to a communications system and method thereof, and more particularly, to a communications system and method for communicating data to a legacy receiver.

BACKGROUND OF THE INVENTION

Generally, vehicles can be equipped with satellite radio receivers as an alternative to, or in combination with, common traditional terrestrial radio receivers. Additionally, satellite radio receivers can be used in places other than vehicles, such as handheld devices. Generally, some satellite radio systems are designed, such that the receiver receives a satellite radio frequency (RF) signal from a satellite and a terrestrial RF signal from a terrestrial repeater or a transponder, which typically provides system redundancy.

The current systems in operation in the U.S. generally use double redundant information to enable high signal availability to receivers. These systems typically use time and spatial redundancy for the satellite signals, such that the signal is transmitted from two sources. Typically, in urban areas, terrestrial repeaters can provide a third signal source. Generally, such systems use different frequencies for the satellite signal and the terrestrial repeater signal. This architecture generally reduces the bandwidth efficiency of the system by one-third ($1/3$), while increasing overall availability.

Generally, the receivers sold to the consumer are configured to receive signals from the satellite and/or terrestrial repeater that is currently in use. However, when the satellite is replaced and/or the satellite radio system is upgraded to include new sources of signals (e.g., a new satellite) the receivers configured to work with the original satellite radio system may not be functional or compatible with the new or upgraded satellite system. In such a scenario, the consumer can be required to purchase a new receiver that is compatible with the new or upgraded satellite radio system.

SUMMARY OF THE INVENTION

According to one aspect of the present invention, a communications system is provided that includes a first receiver. The first receiver includes at least one antenna element configured to receive the first signal having a first polarization, and a combiner in communication with the at least one antenna element, wherein the combiner enhances the first signal and minimizes a second signal having a second polarization that is different than the first polarization, such that an output is emitted by the first receiver based upon the received first signal. The first receiver further includes a beam steerer in communication with the combiner, wherein the beam steerer is configured to steer an antenna beam of the at least one antenna element in order to minimize reflection of the second signal, such that the second polarization of the second signal remains different than the first polarization of the first signal.

According to another aspect of the present invention, a communications system is provided that includes at least one transmitter, a first satellite, a second satellite, a first receiver, and a second receiver. The at least one transmitter is configured to transmit at least a first signal and a second signal. The first satellite is in communication with the transmitter, and is configured to receive the first signal and re-transmit the first signal having a first polarization. The second satellite is in communication with the transmitter, and is configured to receive the second signal and re-transmit the second signal having the second polarization, wherein the first polarization is different than the second polarization. The first receiver includes a plurality of antenna elements configured to receive the first signal from the first satellite, and a combiner in communication with the plurality of antenna elements, wherein the combiner enhances the first signal and minimizes the second signal having the second polarization, such that an output is emitted by the first receiver based upon the received first signal. The first receiver further includes a beam steerer in communication with the combiner, wherein the beam steerer is configured to steer an antenna beam of at least one of the plurality of antenna elements in order to minimize reflection of the second signal, such that the second polarization of the second signal remains different than the first polarization of the first signal. The second receiver includes a plurality of antenna elements configured to receive the first signal from the first satellite and the second signal from the second satellite, wherein the second receiver is configured to emit an output based upon at least one of the received first and second signals.

According to yet another aspect of the present invention, a method of communicating data is provided that includes the steps of transmitting a first signal having a first polarization, transmitting a second signal having a second polarization, wherein the first polarization is different than the second polarization, and providing a first receiver including a plurality of antenna elements configured to receive the first signal. The method further includes the steps of steering an antenna beam of at least one of the plurality of antenna elements in order to minimize reflection of the second signal, such that the second polarization of the second signal remains different than the first polarization of the first signal, enhancing the received first signal, such that the received second signal is minimized, and emitting an output based upon the received first signal.

These and other features, advantages, and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
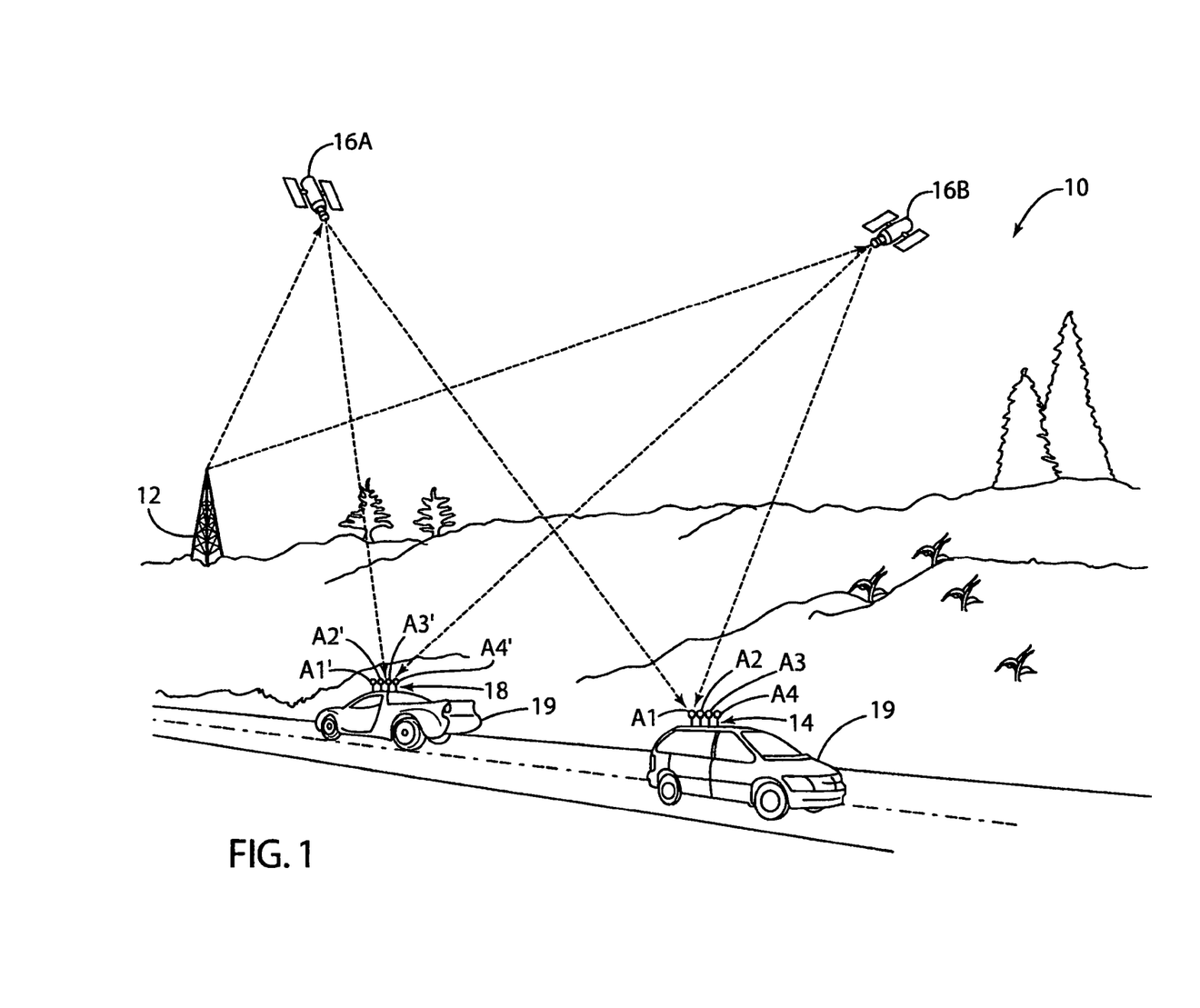
FIG. 1 is an environmental view of a communications system, in accordance with one embodiment of the present invention.

In regards to FIG. 1, a communications system is generally shown at reference identifier 10. The communications system 10 includes at least one transmitter 12 that is configured to transmit at least a first signal and a second signal. The communications system 10 includes a first receiver or a legacy receiver generally indicated at 14, configured to receive the first signal. According to one embodiment, the communications system 10 includes at least a first satellite 16A that receives the first signal from the transmitter 12 and re-transmits the first signal having a first polarization. A second satellite 16B can be included in the communications system 10 to receive and re-transmit the second signal having a second polarization, wherein the second polarization is different than the first polarization. Typically, a second receiver, generally indicated at 18, receives at least one of the first and second signals.

According to one embodiment, one or more terrestrial repeaters can be used to receive and re-transmit the first signal and/or the second signal that are received by at least one of the first and second receivers 14,18. Additionally or alternatively, at least one of the first and second receivers 14,18 can be integrated with a vehicle 19.

According to one embodiment, the first polarization is left hand circular polarization (LHCP) and the second polarization is right hand circular polarization (RHCP). However, it should be appreciated by those skilled in the art that the first and second polarizations can be other suitable polarizations so long as the first polarization is different than the second polarization. By the first and second signals having different polarizations, and the first and second receivers 14,18 including the components described herein, the communications system 10 can include multiple satellites (e.g., the first and second satellites 16A,16B), which broadcast or transmit multiple signals (e.g., the first signal and the second signal) at the same frequency or frequency band in order to increase the available bandwidth, while the first receiver 14, which functions with a single satellite (e.g., the first satellite 16A) can continue to function when additional satellites are added to the communications system 10, as described in greater detail herein.

The at least one transmitter 12 can transmit the first and second signals to the first and second satellites 16A,16B having the same polarization or different polarization, according to one embodiment. Additionally or alternatively, the at least one transmitter 12 can transmit the first and second signals at the same or different frequencies. Thus, the first and second satellites 16A,16B reformat the first and second signals (e.g., polarizations of the first and second signals, frequency of the first and second signal, the like, or a combination thereof), when re-transmitting the first and second signals. Typically, the first and second signals are transmitted to the first and second satellites 16A,16B (i.e., uplinked) at a higher frequency than the first and second signals being re-transmitted to the first and second receivers 14,18 (i.e., downlinked). It should be appreciated by those skilled in the art that the first and second signals can be transmitted by the same transmitter 12 or different transmitters 12.

Figure 2:
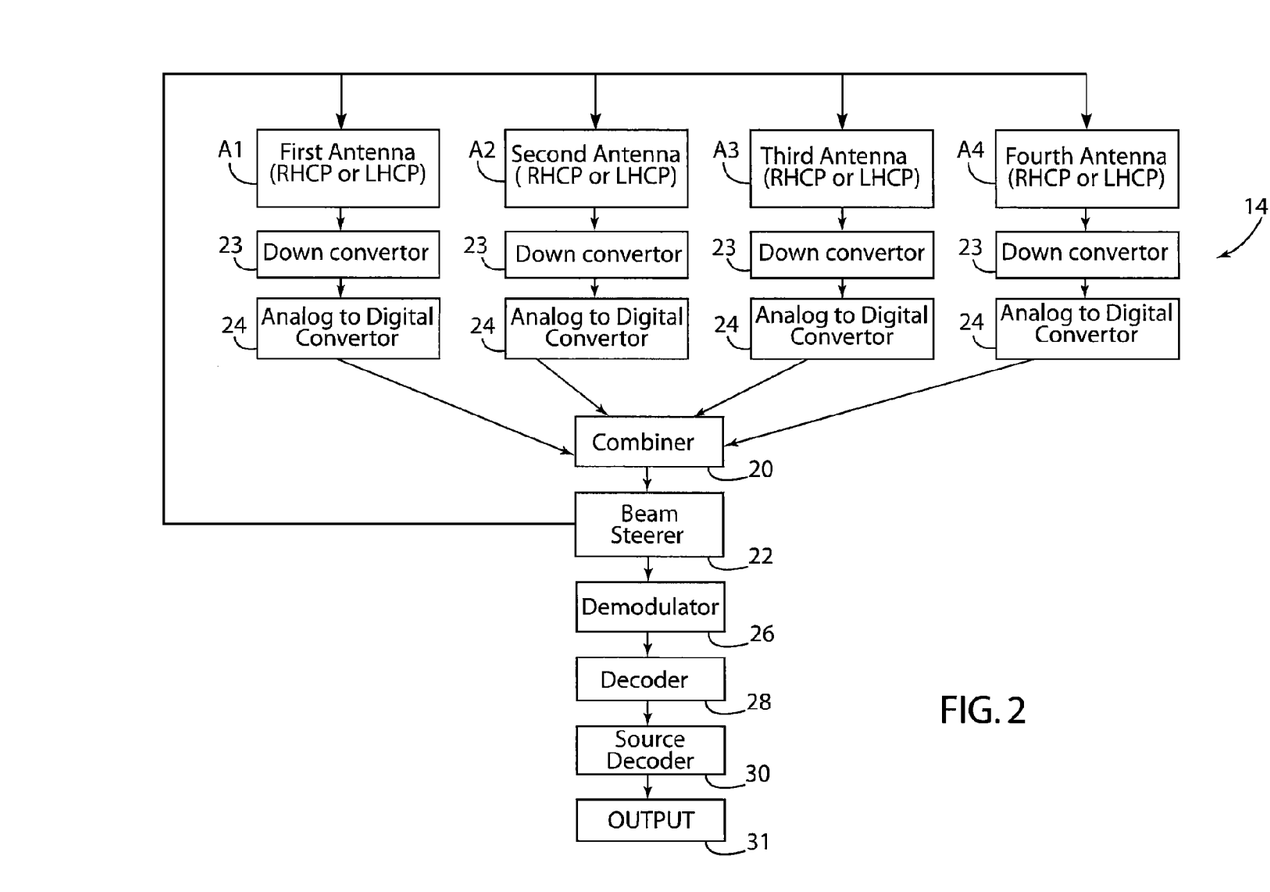
FIG. 2 is a block diagram of a first receiver that may be employed in the communications system of FIG. 1, in accordance with one embodiment of the present invention.

With respect to both FIGS. 1 and 2, the first receiver 14 generally shown, particularly, in FIG. 2, can include a plurality of antenna elements $A_1, \ldots A_N$, such as, but not limited to, a first antenna element $A_1$, a second antenna element $A_2$, a third antenna element $A_3$, and a fourth antenna element $A_4$, which are configured to receive the first signal, according to an exemplary embodiment. It should be appreciated by those skilled in the art that the first receiver 14 can include at least one antenna element $A_1$, and is described herein as including four antenna elements $A_1,A_2,A_3,A_4$ for purposes of explanation and not limitation. It should further be appreciated by those skilled in the art that the antenna elements $A_1,A_2,A_3,A_4$ illustrated in FIG. 2 as being RHCP or LHCP is indicating that the antenna elements $A_1,A_2,A_3,A_4$ are configured to receive a signal having a single, predetermined polarization, such as, but not limited to, either RHCP or LHCP, but are not configured to switch between polarizations of signals that can be received.

The first receiver 14 can further include a combiner 20 in communication with the plurality of antenna elements $A_1,A_2,A_3,A_4$, wherein the combiner 20 is configured to enhance the first signal and minimize any other signals that are received, including the second signal, such that an output is emitted by the first receiver based upon the received first signal. Typically, the first receiver 12 is configured, such that the second signal appears as noise. According to one embodiment, the emitted output is an audio output, a video output, or a combination thereof, such that the transmitter 12 communicates data encoded in the first signal so that the output 31 can be emitted.

The first receiver 14 can further include a beam steerer 22 in communication with the combiner 20, wherein the beam steerer 22 is configured to steer an antenna beam of at least one of the plurality of antenna elements $A_1,A_2,A_3,A_4$ in order to minimize reflection of the second signal, such that the second polarization of the second signal is not changed to the polarization of the first signal. Typically, the beam steerer 22 steers the antenna beam in substantially a direction of the transmission of the first signal.

According to one embodiment, the first receiver 14 further includes at least one down convertor 23 and at least one analog-to-digital (A/D) convertor 24. Typically, the down convertor 23 down converts a frequency of a radio frequency (RF) signal that is received by at least one of the plurality of antenna elements $A_1,A_2,A_3,A_4$ to a lower frequency for transmission through the first receiver 14, and the A/D convertor 24 converts the analog signal received by at least one of the plurality of antenna elements $A_1,A_2,A_3,A_4$ to a digital signal. In such an embodiment, each one of the plurality of antenna elements $A_1,A_2,A_3,A_4$ can be in communication with a separate down convertor 23 and a separate A/D convertor 24, such that the combiner 20 receives the outputs from all the A/D convertors 24. Alternatively, the first receiver 14 can include a single down convertor 23 and a single A/D convertor 24 in communication with all of the plurality of antenna elements $A_1, A_2, A_3, A_4$.

The first receiver 14 can further include a demodulator 26 in communication with the beam steerer 22 that is configured to demodulate the signal received by at least one of the plurality of antenna elements $A_1, A_2, A_3, A_4$. Additionally, the first receiver 14 can include a decoder 28 in communication with the demodulator 26, such that the decoder 38 decodes an output received from the demodulator 26. A source decoder 30 can receive and decode an output of the decoder 38, such that the first receiver 14 can emit an output 31 based upon the received signal.

Figure 3:
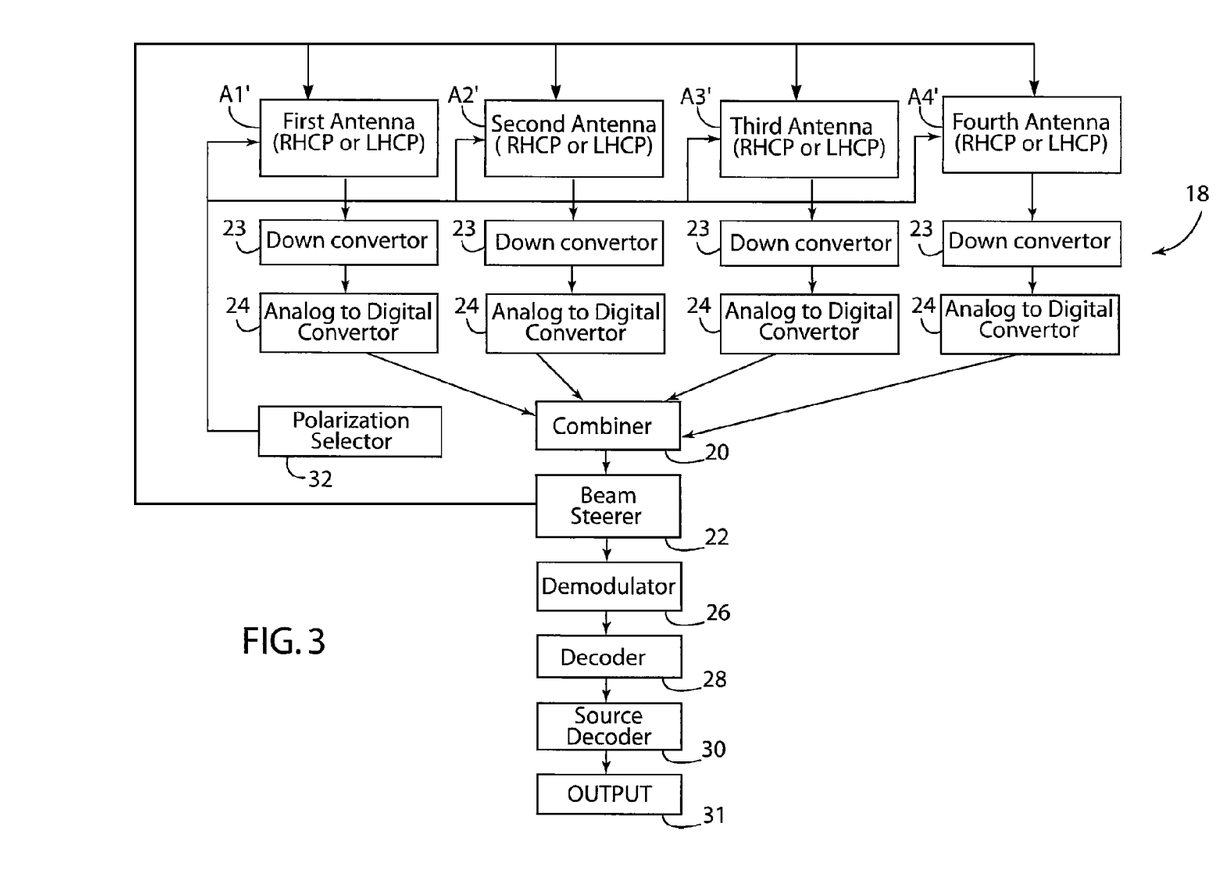
FIG. 3 is a block diagram of a second receiver that may be employed in the communications system of FIG. 1, in accordance with one embodiment of the present invention.
Figure 4:
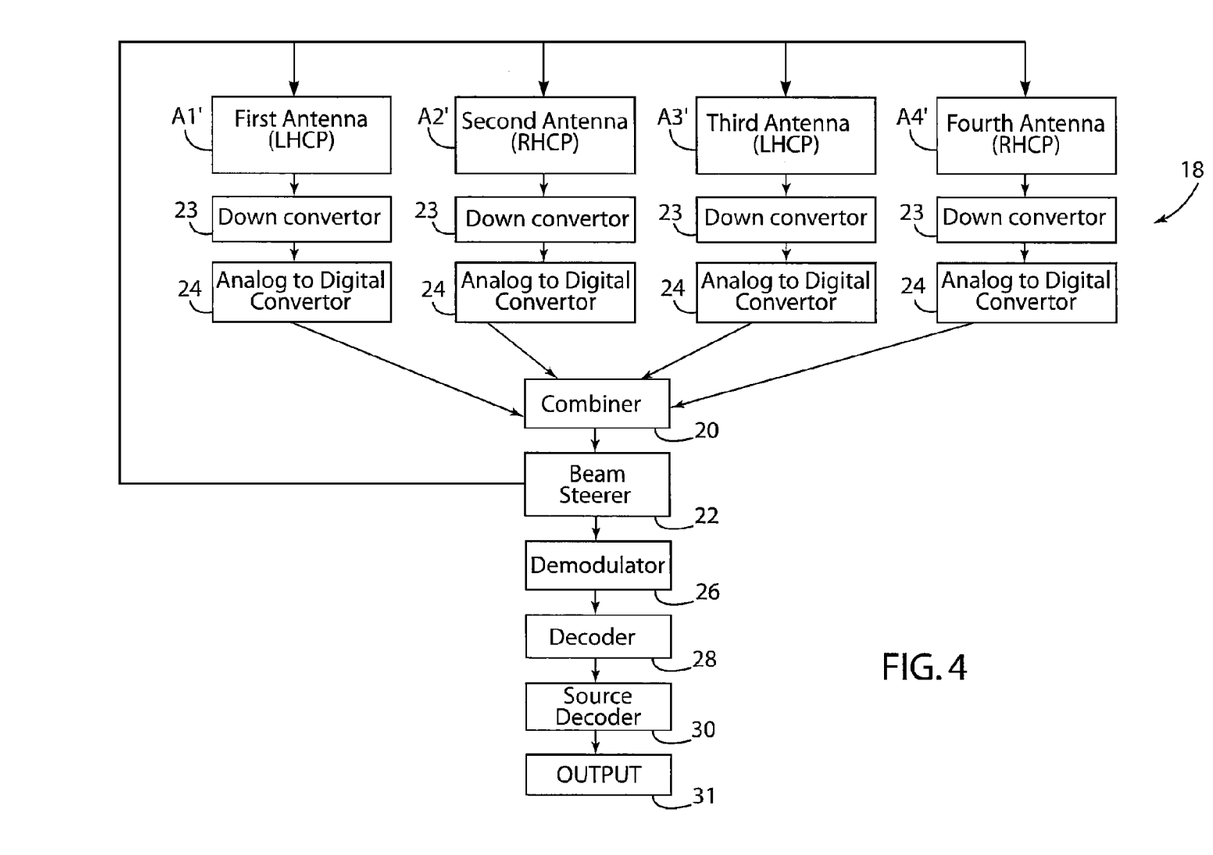
FIG. 4 is a block diagram of a second receiver that may be employed in the communications system of FIG. 1, in accordance with another embodiment of the present invention.
Figure 5:
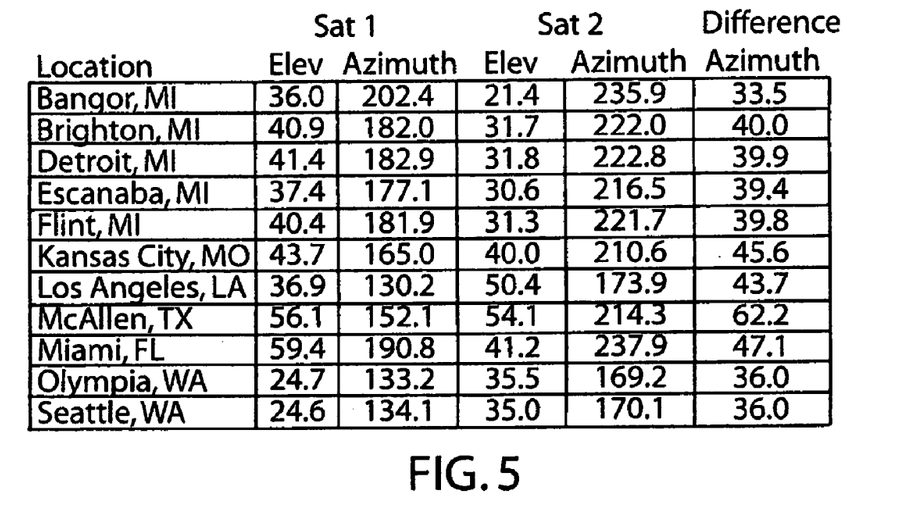
FIG. 5 is a table illustrating exemplary angular separations of different geographical locations with respect to a satellite of a communications system, in accordance with one embodiment of the present invention.

In regards to FIGS. 1, 3, and 4, the second receiver 18 is generally shown, particularly, in FIGS. 3 and 4, according to one embodiment. The second receiver 18 can include a plurality of antenna elements, such as, but not limited to, a first antenna element $A_1'$, a second antenna element $A_2'$, a third antenna element $A_3'$, and a fourth antenna element $A_4'$, wherein at least a portion of the plurality of antenna elements $A_1', A_2', A_3', A_4'$ are configured to receive a first signal having the first polarization, and at least a portion of the plurality of antenna elements $A_1', A_2', A_3', A_4'$ are configured to receive a second signal having the second polarization. Typically, the second receiver 18 emits an output 31 based upon at least one of the first signal and the second signal. According to one embodiment, the plurality of antenna elements $A_1', A_2', A_3', A_4'$ of the second receiver 18 are omnidirectional antenna elements.

Additionally, the second receiver 18 can include the down convertor 23, the A/D convertor 24, the combiner 22, the demodulator 26, the decoder 28, the source decoder 30, or a combination thereof. According to one embodiment, the combiner 20 receives, and combines or processes, the outputs of the A/D convertor 24 that correspond to each of the plurality of antenna elements $A_1', A_2', A_3', A_4'$, and the beam steerer 22 effectively steers the antenna beam of at least a portion of the plurality of antenna elements $A_1', A_2', A_3', A_4'$.

With respect to FIG. 3, the second receiver 18 is shown including a polarization selector 32 for altering the polarization of the plurality of antenna elements $A_1', A_2', A_3', A_4'$, such that the polarization of the signals the plurality of antenna elements $A_1', A_2', A_3', A_4'$ are configured to receive can be altered, according to one embodiment. By way of explanation and not limitation, during a first period of time, the plurality of antenna elements $A_1', A_2', A_3', A_4'$ receive the first signal having the first polarization, and during a second period of time the plurality of antenna elements $A_1', A_2', A_3', A_4'$ receive the second signal having the second polarization. Thus, the polarization selector 32 switches or alters the polarization of the plurality of antenna elements $A_1', A_2', A_3', A_4'$, such that the signals the plurality of antenna elements $A_1', A_2', A_3', A_4'$ are configured to receive is altered, so that the plurality of antenna elements $A_1', A_2', A_3', A_4'$ can emit the output 31 based upon the received first signal, the received second signal, or a combination thereof. It should be appreciated by those skilled in the art that the polarization selector 32 can alter the polarization of the plurality of antenna elements $A_1', A_2', A_3', A_4'$ after a predetermined elapsed time period (e.g., the first period of time and the second period of time), operating conditions of the second receiver 18 (e.g., reception quality of the received signal), desired content to be received (e.g., content encoded in the first signal and different content encoded in the second signal), the like, or a combination thereof.

In regards to FIGS. 1-3, according to one embodiment, the combiner 20 of the first and second receivers 14,18 is a maximum-ratio combiner (MRC) (FIGS. 2 and 3). In such an embodiment, the MRC combiner 20 is configured to maximize a desired signal being received from a desired satellite 16A,16B, while minimizing the affects of other signals received by the plurality of antenna elements, $A_1, A_1', A_2, A_2', A_3, A_3', A_4, A_4'$. Thus, the MRC combiner 20 of the first receiver 14 is designed to maximize the first signal received from the first satellite 16A, while minimizing the second signal transmitted from the second satellite 16B, when the communications system 10 includes a second satellite 16B. Alternatively, the MRC combiner 20 of the second receiver 18 can be configured to maximize the desired signal and minimize the affects of other signals received by the plurality of antenna elements $A_1', A_2', A_3', A_4'$, such that if a user of the second receiver 18 desires to receive the content being encoded in the first signal, the MRC combiner 20 maximizes the affects of the reception of the first signal received from the first satellite 16A, while minimizing the affects of the reception of the second signal transmitted from the second satellite 16B. However, if the user of the second receiver 18 desires the content encoded on the second signal, the polarization selector 32 changes the polarization of the plurality of antenna elements $A_1'A_2', A_3', A_4'$ so that the MRC combiner 20 can maximize the affects of the received second signal transmitted from the second satellite 16B, while minimizing the affects of the first signal transmitted from the first satellite 16A.

In regards to both FIGS. 1 and 4, the second receiver is generally shown, particularly, in FIG. 4, at reference identifier 18, configured according to another embodiment. The second receiver 18 can include the plurality of antenna elements $A_1', A_2', A_3', A_4'$, wherein at least a portion of the plurality of antenna elements $A_1', A_2', A_3', A_4'$ are configured to receive a signal having a first polarization (e.g., LHCP) and another portion of the plurality of antenna elements $A_1', A_2', A_3', A_4'$ are configured to receive the second signal having a second polarization (e.g., RHCP). In such an embodiment, the combiner 20 can be a multiple-input and multiple-output (MIMO) combiner. Typically, the use of the MIMO combiner 20 results in multiple antennas being used to transmit the first and second signals and multiple antennas being used to receive the first and second signals. The use of the MIMO combiner 20 can require the data transmitted in the first and second signals to be precoded, spatially multiplexed, and diversity coded (e.g., orthogonal coded). Typically, when the first and second signals are precoded, the first and second signals are formed to increase the signal gain from constructive combining and reduce multipath fading effects. The first and second signals, are spatially multiplexed so that the high rate signals split into multiple lower rate streams, wherein each stream is transmitted into multiple lower rate streams, and each stream is transmitted from a different transmitted antenna in the same frequency channel. Thus, the plurality of antenna elements $A_1', A_2', A_3', A_4'$ can be configured to receive both the first and second signals having different polarizations substantially simultaneously, and the MIMO combiner 20 is configured to separate each of the satellite signals so that the output 31 can be emitted.

Figure 6:
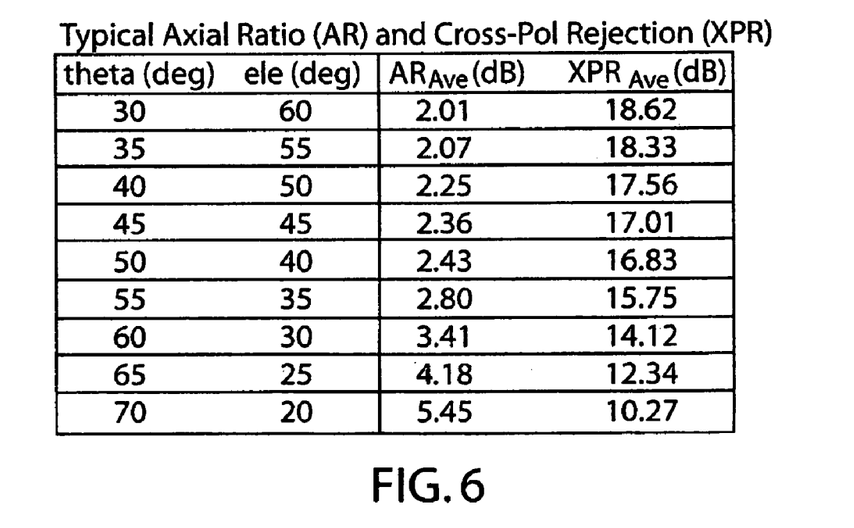
FIG. 6 is a table illustrating exemplary axial ratios and cross-polarization rejections of a receiver having a patch antenna of a communications system, in accordance with one embodiment of the present invention.
Figure 7:
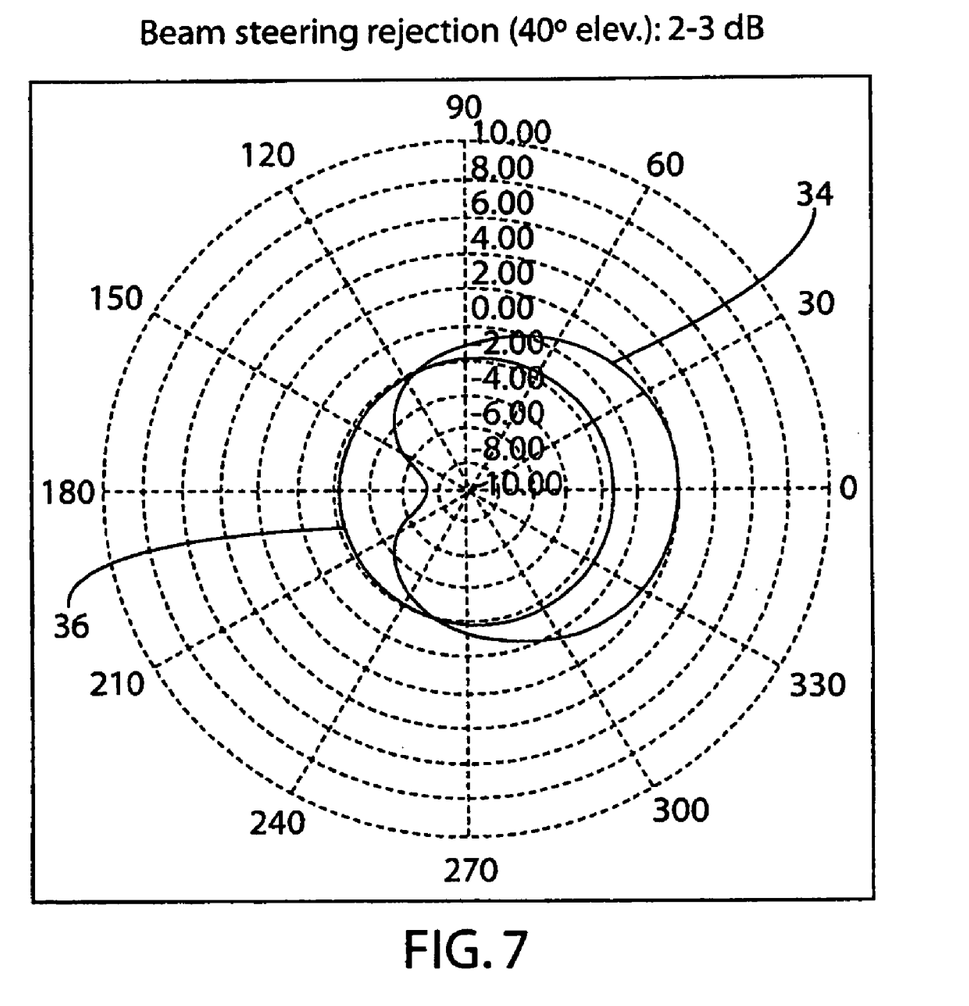
FIG. 7 is a diagram illustrating exemplary beam steering rejections of an antenna element of a first receiver and an antenna element of a second receiver of a communications system, in accordance with one embodiment of the present invention.
Figure 8:
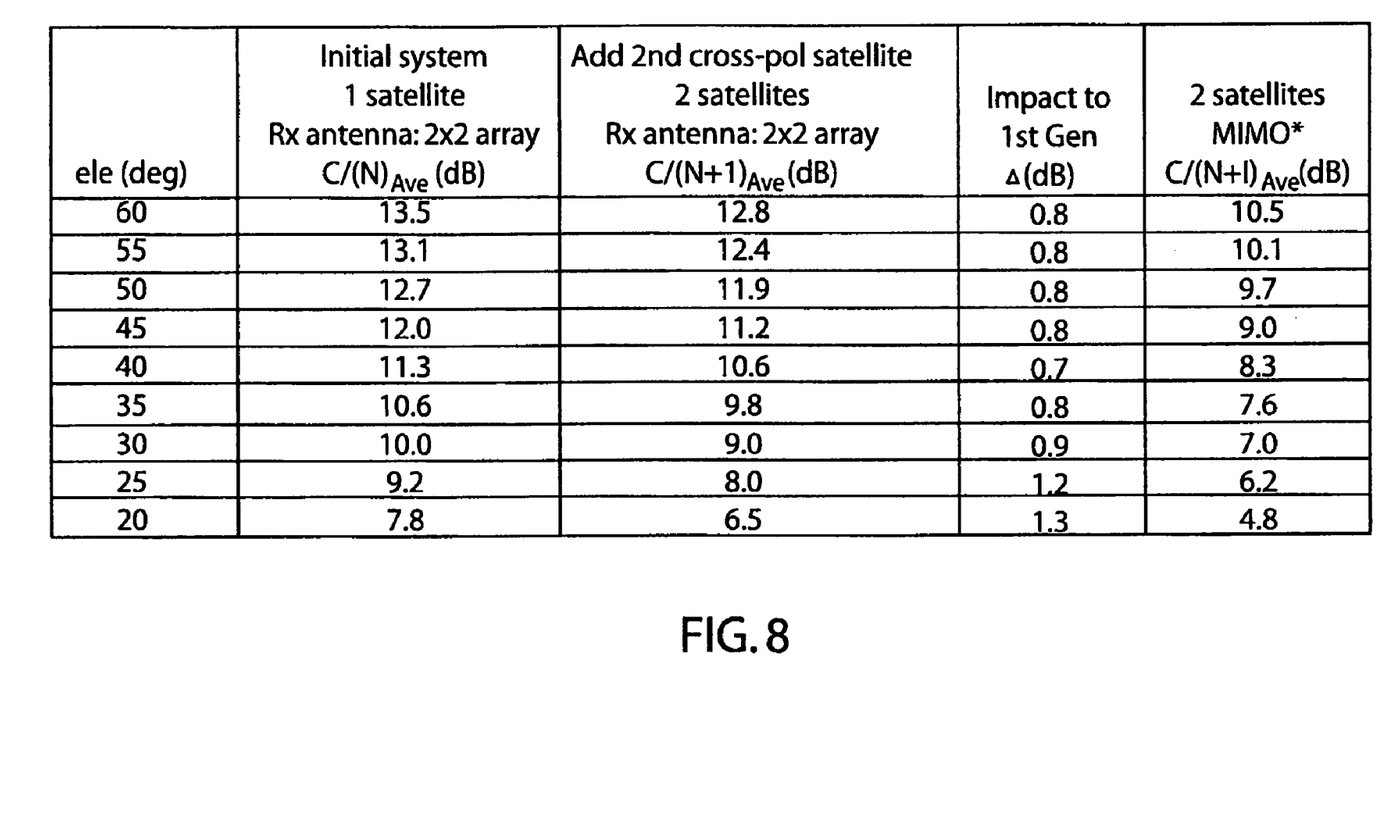
FIG. 8 is a table illustrating exemplary antenna gains based upon reception of signals from first and second satellites by an antenna element of a first receiver and an antenna element of a second receiver, respectively, of a communications system, in accordance with one embodiment of the present invention.

In regards to FIGS. 5-8, FIG. 5 illustrates exemplary angular separations of different geographical locations with respect to the first and second satellites 16A,16B (i.e., elevation (degrees) and azimuth (degrees)), and FIGS. 6-8 illustrate the affect this has on the cross polarization rejection ability of the plurality of antenna elements $A_1, A_1', A_2, A_2', A_3, A_3', A_4, A_4'$ of the first and second receivers 14,18. The data illustrated in FIG. 6 is based upon a receiver device having a patch antenna, according to one embodiment. FIG. 8 illustrates the affects on the signal-to-noise ratio of the received signal when the communications system 10 includes only the first satellite 16A, when the communications system 10 includes both the first and second satellites 16A,16B, and when the communications system 10 includes both the first and second satellites 16A,16B and the second receiver 18 includes the MIMO combiner 20. Further, FIG. 7 illustrates the beam steering rejection when a single antenna is implemented on the receiver 14,18, as indicated by line 34, and when a 2×2 array of antenna elements is being implemented, as indicated by line 36.

Figure 9:
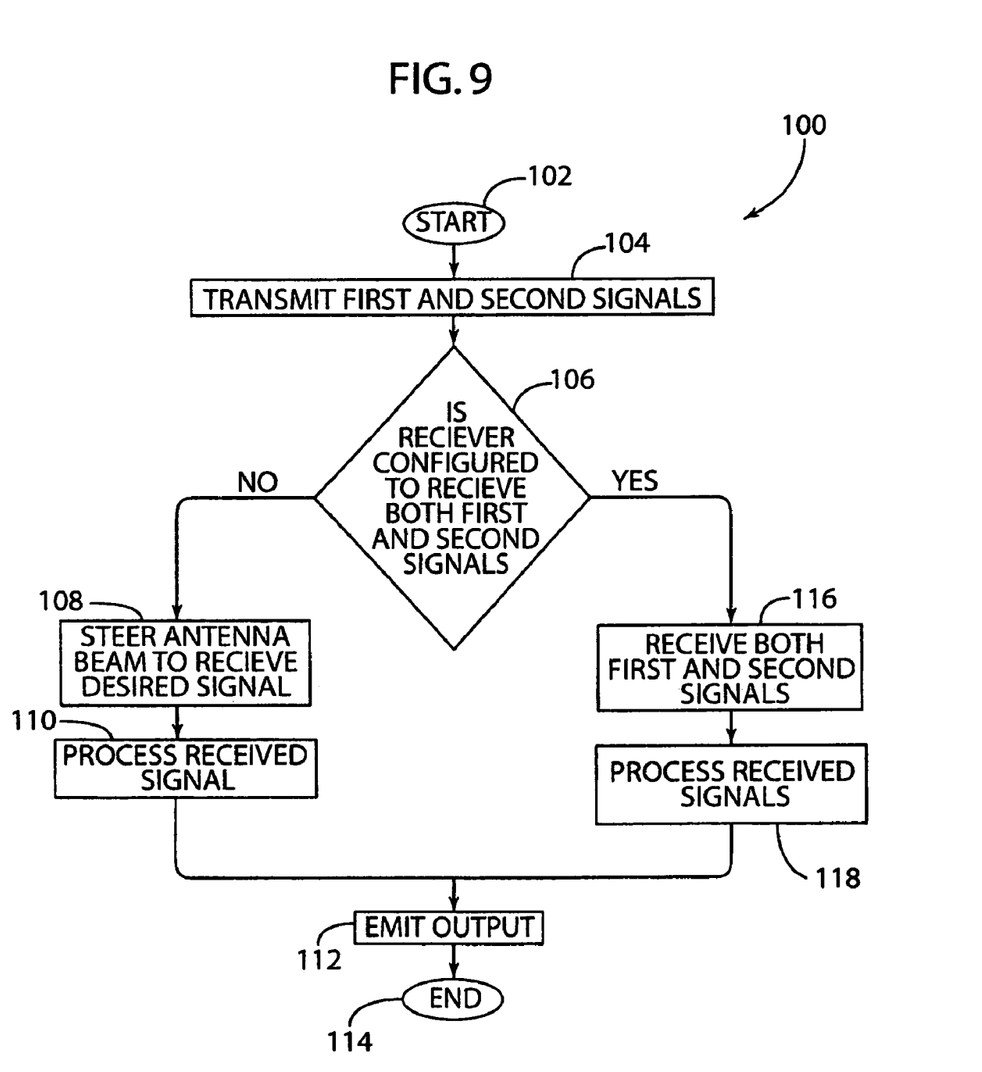
FIG. 9 is a flow chart illustrating a method of communicating data, in accordance with one embodiment of the present invention.

In regards to FIGS. 1-4 and 9, a method of communicating data is generally shown in FIG. 9, at reference identifier 100. The method 100 starts at step 102, and proceeds to step 104, wherein the first and second signals are transmitted. It is determined at decision step 106 whether the receiver is configured to receive both the first and second signals. If it is determined at decision step 106 that the receiver is not configured to receive both the first and second signals, then the method 100 proceeds to step 108. At step 108, the antenna beam of the antenna is steered to receive the desired signal, and at step 110, the received signal is enhanced or processed. Typically, the received signal is enhanced or processed by the A/D convertor 24, the combiner 20, the beam steerer 22, the demodulator 26, the decoder 28, the source decoder 30, or a combination thereof. At step 112, an output is emitted based upon the received signal, and the method 100 then ends at step 114.

However, if it is determined at decision step 106 that the receiver is configured to receive both the first and second signals, then the method 100 proceeds to step 116. At step 116, both the first and second signals are received, and at step 118, the received signals are enhanced or processed. The method 100 then proceeds to step 112, wherein an output is emitted based upon the received signals, and the method 100 then ends at step 114.

Advantageously, the first receiver 14 is configured to receive the first signal having the first polarization when the communications system 10 includes the first satellite 16A. Additionally, the communications system 10 includes the second receiver 18, which is configured to receive the first and second signals having the first and second polarizations, while the first receiver 14 continues to function once the second satellite 16B is entered into the communications system 10. Thus, users of the communications system 10 do not need to purchase new receivers when the communications system 10 is updated with new satellites to increase the bandwidth capabilities of the communications system 10.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims, as interpreted according to the principles of patent law, including the doctrine of equivalents.

The invention claimed is:

1. A communications system comprising:
   a first receiver comprising:
   a first plurality of antenna elements comprising a first antenna element configured to preferentially receive a first signal having a first circular polarization and preferentially reject a second signal having a second circular polarization different than said first circular polarization;
   a combiner in communication with said first plurality of antenna elements, wherein said combiner enhances said first signal and minimizes said second signal, such that a first output is emitted by said first receiver based upon said received first signal; and
   a beam steerer in communication with said combiner, wherein said beam steerer is configured to steer an antenna beam of said first plurality of antenna elements in order to minimize reception of a reflection of said second signal; and
   a second receiver having a second plurality of antenna elements, wherein at least a first portion of said second plurality of antenna elements are configured to receive said first signal having said first circular polarization, and at least a second portion of said second plurality of antenna elements are configured to receive said second signal having said second circular polarization, wherein said second receiver emits a second output based upon at least one of said first signal and said second signal.

2. The communications system of claim 1, wherein said second receiver is configured for multiple-input and multiple-output (MIMO) communications.

3. The communications system of claim 1, further comprising at least one transmitter configured to transmit at least said first signal and said second signal, wherein a first satellite is configured to receive said first signal from said transmitter, and re-transmit said first signal having said first circular polarization.

4. The communications system of claim 3 further comprising a second satellite configured to receive said second signal from said transmitter, and re-transmit said second signal having said second circular polarization.

5. The communications system of claim 1, wherein said combiner is a maximal-ratio combiner (MRC).

6. The communications system of claim 1, wherein said first receiver further comprises at least one analog-to-digital (A/D) convertor in communication with said first plurality of antenna elements, wherein said at least one A/D convertor converts said first signal received by said first plurality of antenna elements to a digital signal.

7. The communications system of claim 1, wherein said first receiver is configured, such that said second signal appears as noise.

8. The communications system of claim 1, wherein said first receiver is integrated with a vehicle.

9. A communications system comprising:
   at least one transmitter configured to transmit at least a first signal and a second signal;
   a first satellite in communication with said transmitter configured to receive said first signal and re-transmit said first signal having a first circular polarization;
   a second satellite in communication with said transmitter configured to receive said second signal and re-transmit said second signal having a second circular polarization, wherein said first circular polarization is different than said second circular polarization;
   a first receiver comprising:
   a first plurality of antenna elements comprising a first antenna element configured to preferentially receive said first signal from said first satellite and preferentially reject said second signal;
   a combiner in communication with said first plurality of antenna elements, wherein said combiner enhances said first signal and minimizes said second signal, such that a first output is emitted by said first receiver based upon said received first signal; and
   a beam steerer in communication with said combiner, wherein said beam steerer is configured to steer an antenna beam of said first plurality of antenna elements in order to minimize reception of a reflection of said second signal; and a second receiver comprising:

a second plurality of antenna elements, wherein at least a first portion of said second plurality of antenna elements are configured to receive said first signal from said first satellite and at least a second portion of said second plurality of antenna elements are configured to receive said second signal from said second satellite, wherein said second receiver is configured to emit a second output based upon at least one of said received first and second signals.

10. The communications system of claim 9, wherein said beam steerer of said first receiver steers said antenna beam of at least one of said first plurality of antenna elements in substantially a direction of said transmission of said first signal.

11. The communications system of claim 9, wherein said second receiver is configured for multiple-input and multiple-output (MIMO) communications.

12. The communications system of claim 9, wherein said combiner is a maximal-ratio combiner (MRC).

13. The communications system of claim 9, wherein said first receiver is configured, such that said second signal appears as noise.

14. A method of communicating data, said method comprising the steps of:

transmitting a first signal having a first circular polarization;

transmitting a second signal having a second circular polarization, wherein said first circular polarization is different than said second circular polarization;

providing a first receiver comprising a first plurality of antenna elements including a first antenna element configured to preferentially receive said first signal and preferentially reject said second signal;

beam steering an antenna beam of at least one of said first plurality of antenna elements in order to minimize reception of a reflection of said second signal;

enhancing said received first signal, such that said received second signal is minimized;

emitting a first output based upon said received first signal;

providing a second receiver comprising a second plurality of antenna elements configured to receive at least one of said first and second signals; and emitting a second output based upon at least one of said received first signal and second signals, wherein a polarization of said second plurality of antenna elements of said second receiver are altered, such that said second plurality of antenna elements are configured to receive said first signal during a first period of time, and said second plurality of antenna elements are configured to receive said second signal during a second period of time.

15. The method of claim 14, further comprising the steps of:

receiving said first signal;
re-transmitting said first signal having said first circular polarization by a first satellite;
receiving said second signal; and
re-transmitting said second signal having said second circular polarization by a second satellite.

16. The communications system of claim 1, further comprising a polarization selector in communication with said combiner, wherein the polarization selector alters the second circular polarization of the second plurality of antenna elements.

17. The communications system of claim 16, wherein the second circular polarization of said second plurality of antenna elements of said second receiver are altered, such that said second plurality of antenna elements are configured to receive said first signal during a first period of time, and said second plurality of antenna elements are configured to receive said second signal during a second period of time.

18. The communications system of claim 9, further comprising a polarization selector in communication with said combiner, wherein the polarization selector alters the second circular polarization of the second plurality of antenna elements.

19. The communications system of claim 18, wherein the second circular polarization of said second plurality of antenna elements of said second receiver are altered, such that said second plurality of antenna elements are configured to receive said first signal during a first period of time, and said second plurality of antenna elements are configured to receive said second signal during a second period of time.

* * * * *